No. 724,059. PATENTED MAR. 31, 1903.
C. M. R. SY.
DEVICE FOR CLEANING WINDOWS.
APPLICATION FILED APR. 8, 1902.
NO MODEL.

Attest
R. M. Kelly
Wm. Rooney

Inventor
C. M. R. Sy
By his atty

UNITED STATES PATENT OFFICE.

CARL MARTIN RICHARD SY, OF HAMBURG, GERMANY.

DEVICE FOR CLEANING WINDOWS.

SPECIFICATION forming part of Letters Patent No. 724,059, dated March 31, 1903.

Application filed April 8, 1902. Serial No. 101,968. (No model.)

*To all whom it may concern:*

Be it known that I, CARL MARTIN RICHARD SY, a subject of the Emperor of Germany, residing at Gundelhof 75, Hamburg, Germany, have invented a certain new and useful Improved Device for Cleaning Windows, of which the following is a specification.

The subject of this application is a device for cleaning window-panes, especially for wiping off the moisture which detracts from the transparency of the panes. Several such arrangements are already known, which, however, present various disadvantages. The majority of these in a highly disadvantageous manner clean or dry the window by the upward-and-downward motion of the cleaning device, and those which do so only in one direction are generally of a complicated nature.

The characteristic of this invention consists in the fact that by a simple form of the cleaning-strip secured to a suspended beam on changing the direction of motion such a transposition of the beam and strip relatively to the window takes place that wiping only takes place on the downward motion of the cleaning or drying device and on the upward motion the cleaning-strip is raised from off the window-pane.

Figure 1:
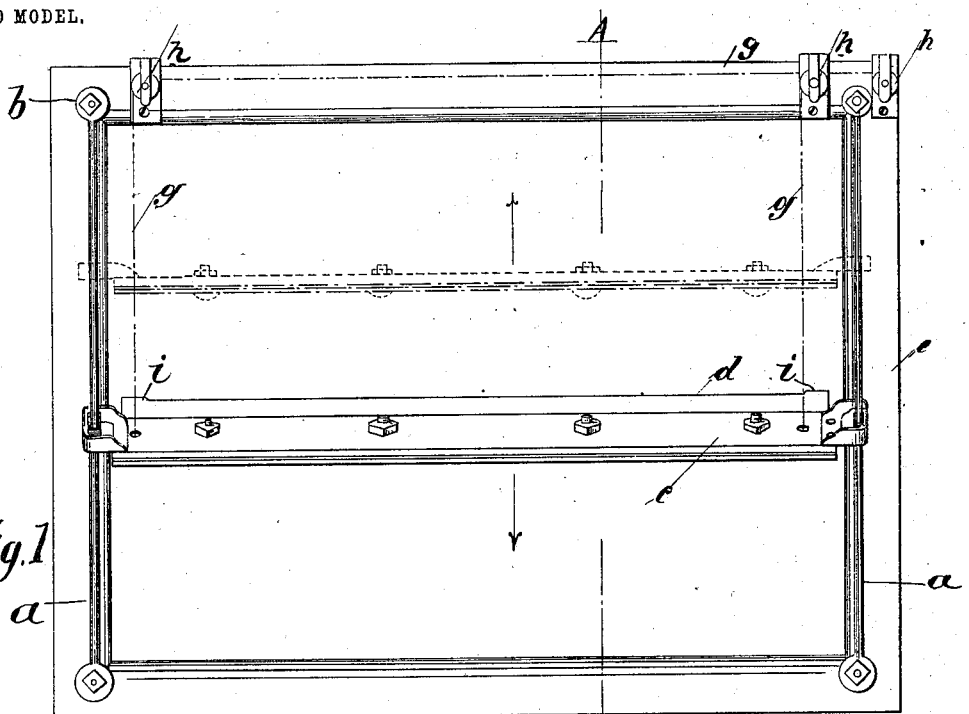
Figure 3:
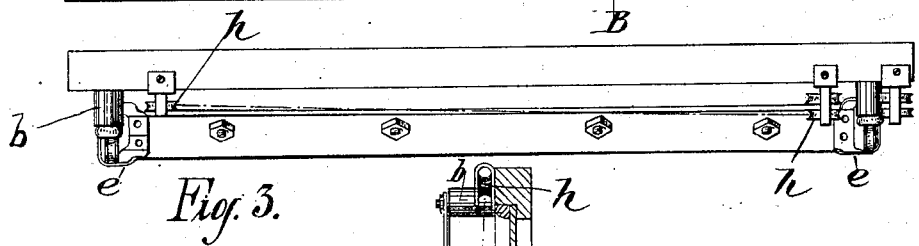
Figure 2:
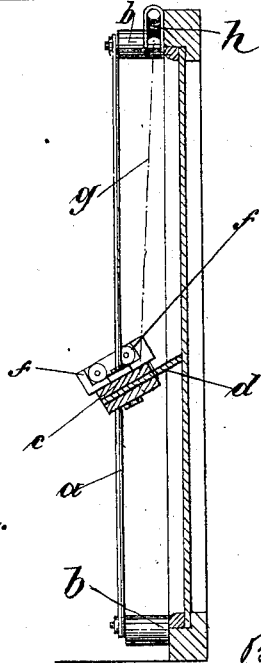

In the accompanying drawings, which illustrate the invention, Figure 1 is a front elevation of the device secured to a window-pane; Fig. 2, a transverse section along A B of Fig. 1. Fig. 3 is a plan of Fig. 1.

At both sides of the window-pane are arranged guiding-rods $a$, which rods are screwed to the window-sash, with rubber blocks $b$ inserted between said rods and the sash, so that in consequence of the rubber blocks $b$ the distance of the rods relatively to the window may be regulated, these rods being preferably secured by means of studs and nuts. On these rods $a$ slides the wiper, which consists of a heavy beam $c$ and the special rubber washer, which is a suitably-shaped rubber strip. This rubber strip is firmly clamped to an upper metal plate by means of a second metal plate, both of which constitute the beam. The upper plate is provided at both sides with a clasp $e$, in which two rollers $f$ have their bearings, between which rollers the rods $a$ pass. The beam $c$ is suspended, by means of cords $g$, in such wise that the beam tends to tilt backward in the direction shown in Figs. 1 and 2. The cords $g$ are, as shown at Fig. 1, led over rollers $h$ and united in a single pull-cord. At both sides the rubber strip is so formed that it is a trifle broader there than at its main body. When the beam $c$ is pulled down, these widened ends $i\ i$, owing to the inclined position of the strip, will be more or less flattened against the pane, and the edge of the strip between the ends will make wiping contact with the face of the pane. When the beam is pulled up, however, these two ends $i\ i$ will act in the nature of fulcra, and the beam will assume a horizontal position, as shown in dotted lines in Fig. 1, with the two widened ends of the strip in contact with the pane and the intermediate portion out of contact. The edge of the strip will thus be in wiping contact with the pane only when moving in one direction. The rubber blocks $b$, interposed between the ends of the rods $a$ and frame, form elastic supports and enable the rods to be adjusted to or from the plane of the pane to regulate the pressure of the wiping-strip on the glass.

What I claim, and desire to secure by Letters Patent of the United States, is—

1. In a window-cleaning device, the reciprocating wiping-strip, provided at its ends on the wiping edge with widened portions or projections, substantially as and for the purpose described.

2. In a window-cleaning device, the combination with guide-rods, of an unequally-balanced beam supported thereby and movable thereon, and a wiping-strip carried by said beam and provided on its wiping edge with widened portions or projections, substantially as and for the purposes described.

3. In a window-cleaning device, the combination with guide-rods, of an unequally-balanced beam supported thereby and movable thereon, means to adjust the guide-rods to and from the face of the pane, and a wiping-strip carried by said beam and provided on its wiping edge with widened portions or projections, substantially as and for the purposes described.

4. In a window-cleaning device, the combination with guide-rods, of an unequally-balanced beam supported thereby and movable thereon, yielding supports between the guide-rods and the window-frame, means to adjust said rods and supports, and a wiping-strip carried by said beam and provided on its wiping edge with widened portions or projections, substantially as and for the purposes described.

In testimony whereof I have hereunto set my hand in the presence of two witnesses.

CARL MARTIN RICHARD SY.

Witnesses:
ALFRED RICBOUR,
E. H. L. MUMMENHOFF.